United States Patent
Handshaw et al.

(10) Patent No.: US 9,361,496 B2
(45) Date of Patent: Jun. 7, 2016

(54) APPARATUS FOR AND METHOD OF AUDIBLY GUIDING A USER TO A SELECTED TARGET FROM AN ARRAY OF TARGETS

(71) Applicant: Symbol Technologies, Inc., Schaumburg, IL (US)

(72) Inventors: Darran M. Handshaw, Sound Beach, NY (US); Timothy J. Trautman, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 13/864,305

(22) Filed: Apr. 17, 2013

(65) Prior Publication Data

US 2014/0312119 A1  Oct. 23, 2014

(51) Int. Cl.
*G06K 7/10* (2006.01)

(52) U.S. Cl.
CPC .... *G06K 7/10881* (2013.01); *G06K 2207/1011* (2013.01)

(58) Field of Classification Search
CPC ............ G06K 7/1443; G06K 7/10722; G06K 2007/1011; G06K 7/10881
USPC .................. 235/454, 462.01, 472.01, 462.08, 235/462.2, 462.25, 462.48
See application file for complete search history.

(56) References Cited

U.S. PATENT DOCUMENTS

| | | | |
|---|---|---|---|
| 5,668,364 A | | 9/1997 | Swartz et al. |
| 5,825,010 A | * | 10/1998 | Charych et al. .......... 235/472.01 |
| 6,000,617 A | * | 12/1999 | Swartz et al. .............. 235/462.2 |
| 6,708,883 B2 | | 3/2004 | Krichever |
| 8,181,878 B2 | * | 5/2012 | Nunnink et al. ......... 235/462.22 |
| 8,517,273 B2 | * | 8/2013 | Tamburrini et al. .......... 235/470 |
| 8,608,075 B2 | * | 12/2013 | Tanimoto et al. ........ 235/462.24 |
| 2006/0081712 A1 | * | 4/2006 | Rudeen .............. G06K 7/10722 235/462.08 |
| 2006/0208086 A1 | * | 9/2006 | Rudeen et al. ........... 235/472.01 |
| 2007/0170259 A1 | * | 7/2007 | Nunnink et al. ......... 235/462.21 |
| 2008/0073434 A1 | * | 3/2008 | Epshteyn et al. ............. 235/454 |
| 2011/0290889 A1 | * | 12/2011 | Tamburrini et al. .......... 235/470 |
| 2012/0248192 A1 | * | 10/2012 | Tanimoto et al. ........ 235/462.24 |

* cited by examiner

*Primary Examiner* — Paultep Savusdiphol
(74) *Attorney, Agent, or Firm* — Nong-Qiang Fan

(57) ABSTRACT

A user is audibly guided to a selected target from an array of targets, by successively aiming a handheld housing at successive targets in the array, manually actuating a trigger between an aiming state and a reading state, and capturing over a field of view an image of each successive target at which the housing is successively aimed. A controller is operative, in the aiming state of the trigger, for processing the image to detect when each successive target is located in the field of view and for responsively controlling an auditory annunciator to generate an audible aiming sound for each detected successive target. The audible aiming sound for each detected successive target is operative to audibly guide the user to aim the housing at the selected target. The controller is further operative, in the reading state of the trigger, for transmitting away from the housing data indicative of a processed image of the selected target.

20 Claims, 4 Drawing Sheets though the known imaging readers are generally satisfactory for their intended purpose, one concern relates to the aiming process. A mechanical sighting element is not that accurate. An aiming light generator is costly, and adds extra electrical energy consumption, weight and size to the reader. Sometimes, the projected aiming light pattern is annoying and bothersome to the user, or to others in the vicinity of the reader. Sometimes, the projected aiming light pattern is not readily visible in a brightly lit venue. Aiming light generators also can have parallax, thereby introducing aiming errors.

APPARATUS FOR AND METHOD OF AUDIBLY GUIDING A USER TO A SELECTED TARGET FROM AN ARRAY OF TARGETS

FIELD OF THE DISCLOSURE

The present disclosure relates generally to an apparatus for, and a method of, audibly guiding a user to a selected target from an array of targets, especially targets that are closely arranged relative to one another in one- or two-dimensional arrays and, more particularly, to electro-optically reading the selected target by image capture.

BACKGROUND

Solid-state imaging systems or imaging readers have been used, in both handheld and/or hands-free modes of operation, to electro-optically read targets, such as one- and/or two-dimensional bar code symbols, each bearing elements, e.g., bars and spaces, of different widths and reflectivities, to be decoded, as well as fields in forms, such as documents, labels, receipts, signatures, drivers' licenses, identification badges, and payment/loyalty cards, etc., in retail stores, warehouses, distribution centers, libraries, and myriad other businesses.

A known exemplary imaging reader includes a housing either held by a user and/or supported on a cradle, stand or like support, a window supported by the housing and aimed at the target, and an imaging engine or module supported by the housing and having a solid-state imager (or image sensor) with a sensor array of photocells or light sensors (also known as pixels), and an imaging lens assembly for capturing return light scattered and/or reflected from the target being imaged through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or characters or marks indicative of text in a field of a form, or into a picture indicative of graphics in a field of the form. If the target is a symbol associated with a retail product, then the decoded signal identifies the product and is transmitted to a host, e.g., a cash register or computer in, or remote from, a retail venue, for further processing, e.g., product price look-up or product inventorying.

In the handheld mode, the user may first lift the reader from a countertop or a support stand or cradle, and then hold the reader in his or her hand at a certain distance away from the target to be imaged, and then aim the reader at the target. Aiming has typically been performed either by having a user physically sight the target by viewing along a raised mechanical sighting element on the reader housing, or by having the user position the target relative to an aiming light pattern or mark projected onto the target by an on-board aiming light generator. A trigger is typically manually actuated by the user to initiate reading. Once reading is completed, the user may return the reader to the countertop or to the support stand to resume hands-free operation. An on-board beeper provides audio feedback of a successful read of the target. The beeper is an electroacoustic transducer that converts electrical energy into mechanical energy to emit a single audible beeping tone, or a plurality of the same beeping tones, when the target has been successfully read.

Although the known imaging readers are generally satisfactory for their intended purpose, one concern relates to the aiming process. A mechanical sighting element is not that accurate. An aiming light generator is costly, and adds extra electrical energy consumption, weight and size to the reader. Sometimes, the projected aiming light pattern is annoying and bothersome to the user, or to others in the vicinity of the reader. Sometimes, the projected aiming light pattern is not readily visible in a brightly lit venue. Aiming light generators also can have parallax, thereby introducing aiming errors.

In addition, there are circumstances in which the targets are tightly packed together and closely arranged relative to one another so that it is difficult for the user to accurately aim at any one selected target from among multiple targets. For example, multiple targets can be crowded or closely stacked along a one-dimensional row or column, typically in a pick list, thereby making it difficult to select any one target from the list. As another example, multiple targets can be closely spaced together in a two-dimensional array of mutually orthogonal rows and columns, typically on a packaging label, again making it difficult to select any one target from the label. Sometimes, a projected aiming light pattern is so large that it covers more than one target, again making it hard for the user to select just one target from all the covered targets.

Accordingly, there is a need to provide an apparatus for, and a method of, accurately aiming a handheld imaging reader at a selected target, without resorting to mechanical sighting elements or aiming light generators, especially for aiming the reader at a target selected from multiple targets that are closely crowded together.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
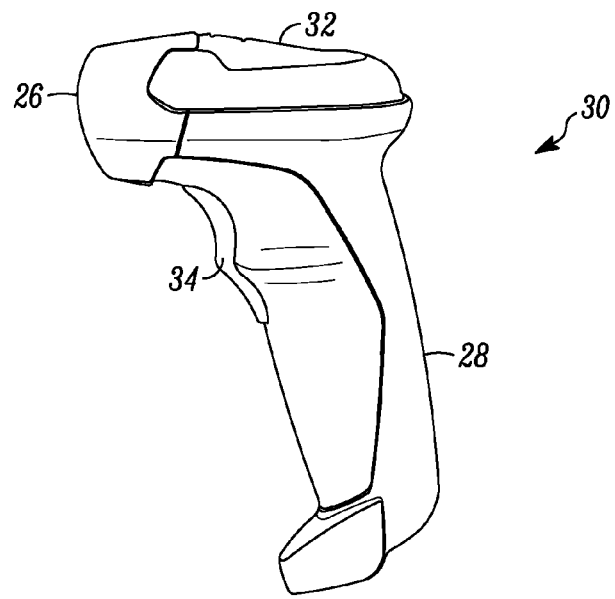
FIG. 1 is a side elevational view of a handheld imaging reader that can be audibly guided to a selected target to be electro-optically read by image capture in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One feature of this disclosure resides, briefly stated, in an apparatus for audibly guiding a user to a selected target from an array of targets. The apparatus includes a handheld housing successively aimable by the user at successive targets in the array, a trigger supported by the housing and manually actuatable between an aiming state and a reading state, an imaging assembly supported by the housing and operative for capturing over a field of view an image of each successive target at which the housing is successively aimed, an auditory annunciator supported by the housing, and a controller. The controller is operative, in the aiming state of the trigger, for processing the image to detect when each successive target is located in the field of view and for responsively controlling the annunciator to generate an audible aiming sound for each detected successive target. The audible aiming sound for each detected successive target is operative to audibly guide the user to aim the housing at the selected target. The controller is further operative, in the reading state of the trigger, for transmitting away from the housing data indicative of a processed image of the selected target.

In preferred embodiment, the controller is operative, in the reading state of the trigger, for generating for the selected target an audible successful reading sound that is different from the audible aiming sound. Both the audible successful reading sound and the audible aiming sound are advantageously generated by the same annunciator.

In accordance with another aspect of this disclosure, a method of audibly guiding a user to a selected target from an array of targets, is performed by successively aiming a handheld housing at successive targets in the array, manually actuating a trigger on the housing to an aiming state, capturing over a field of view an image of each successive target at which the housing is successively aimed, processing the image to detect when each successive target is located in the field of view in the aiming state of the trigger, generating an audible aiming sound for each detected successive target in the aiming state of the trigger, audibly guiding the user to aim the housing at the selected target by listening to the audible aiming sound for each detected successive target, manually actuating the trigger to a reading state, and transmitting away from the housing data indicative of a processed image of the selected target in the reading state of the trigger.

Turning now to the drawings, reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted relative to the vertical. The imaging reader 30 is held in an operator's hand and used in a handheld mode in which a multi-state trigger 34 is manually depressed to initiate aiming, imaging, and reading of targets, as described in detail below, especially of symbols and/or fields in forms, to be read in a range of working distances relative to the window 26. Housings of other configurations can also be employed.

Figure 2:
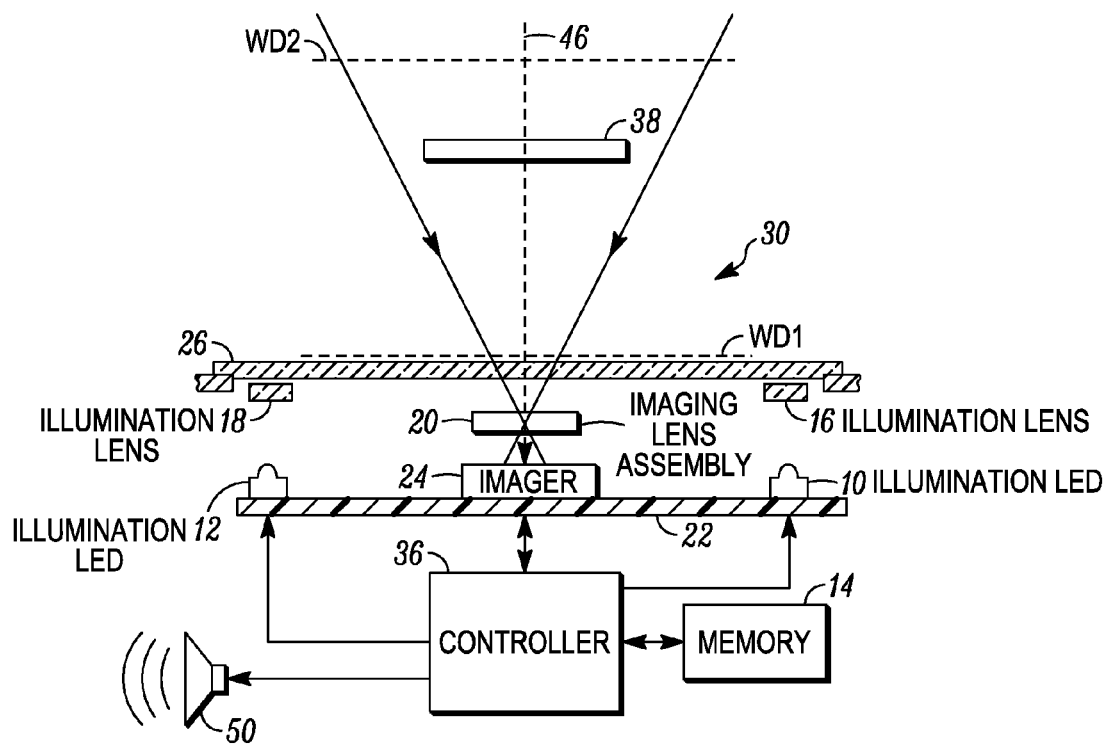
FIG. 2 is a schematic diagram of various components of the reader of FIG. 1.

As schematically shown in FIG. 2, an imaging system or module includes an imager 24 mounted on a printed circuit board (PCB) 22 in the reader 30. The PCB 22 is mounted within the tilted handle 28. The imager 24 is a solid-state device, for example, a CCD or a CMOS imager having a one- or a two-dimensional sensor array of addressable image sensors or pixels arranged in either a single row, or in mutually orthogonal rows and columns, respectively, and operative for detecting return light captured by an imaging lens assembly 20 along an imaging axis 46 through the window 26. The return light is scattered and/or reflected from a target 38 over a field of view. The field of view is generally perpendicular to the imaging axis 46.

The imaging lens assembly 20 is part of the imaging system and is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is either at or about one-half inch from the window 26, and WD2 is about thirty inches away from the window 26.

An illuminating light assembly is optionally also mounted in the imaging reader and includes an illumination light source, e.g., at least one light emitting diode (LED), and preferably a plurality of LEDs, such as a pair of LEDs 10, 12, and a pair of lenses 16, 18 configured to generate a substantially uniform distributed illumination pattern of light on and along the target 38 to be read by image capture. At least part of the scattered and/or reflected return light is derived from the illumination pattern of light on and along the target 38.

As shown in FIG. 2, the imager 24 and the LEDs 10, 12 are operatively connected to a controller or microprocessor 36 operative for controlling the operation of these components. A memory 14 is connected and accessible to the controller 36. Preferably, the microprocessor 36 is the same as the one used for processing the return light from the target 38. An auditory annunciator or beeper 50 is connected to the microprocessor 36, and generates an audible successful reading sound of a successful read of the target, as described below. The beeper 50 is an electroacoustic transducer that converts electrical energy into mechanical energy to emit a single audible beeping tone, or a plurality of the same beeping tones, when the target 38 has been successfully read.

In operation, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target 38 only during said exposure time period. A typical array needs about 11-33 milliseconds to acquire the entire target image and operates at a frame rate of about 30-90 frames per second.

In accordance with one aspect of this disclosure, the trigger 34 is manually actuated to an aiming state. For example, this aiming state can be actuated by having the user pull and hold the trigger 34 depressed. The microprocessor 36 is operative, in the aiming state of the trigger 34, for processing the image to detect when the target 38 is located in the field of view, and preferably when the target 38 is centrally located in the field of view, and for responsively controlling the beeper 50 to generate an audible aiming sound for the target 38. This audible aiming sound can be a single audible beeping tone, or a plurality of the same beeping tones, but is different from the aforementioned audible successful reading sound that is generated in response to a successful reading of the target 38. Advantageously, the same beeper 50 is used to generate both the audible successful reading sound and the audible aiming sound, although it is possible to use separate auditory annunciators or beepers to generate the respective different sounds.

When the target 38 has been selected, the trigger 34 is manually actuated to a reading state. For example, this reading state can be actuated by having the user release the trigger 34. The microprocessor 36 is further operative, in the reading state of the trigger 34, for transmitting away from the housing, for example, to a host computer, data indicative of a processed image of the target 38. At this point, the microprocessor 36 generates the audible successful reading sound that is indicative of a successful read of the target 38.

Figure 3:
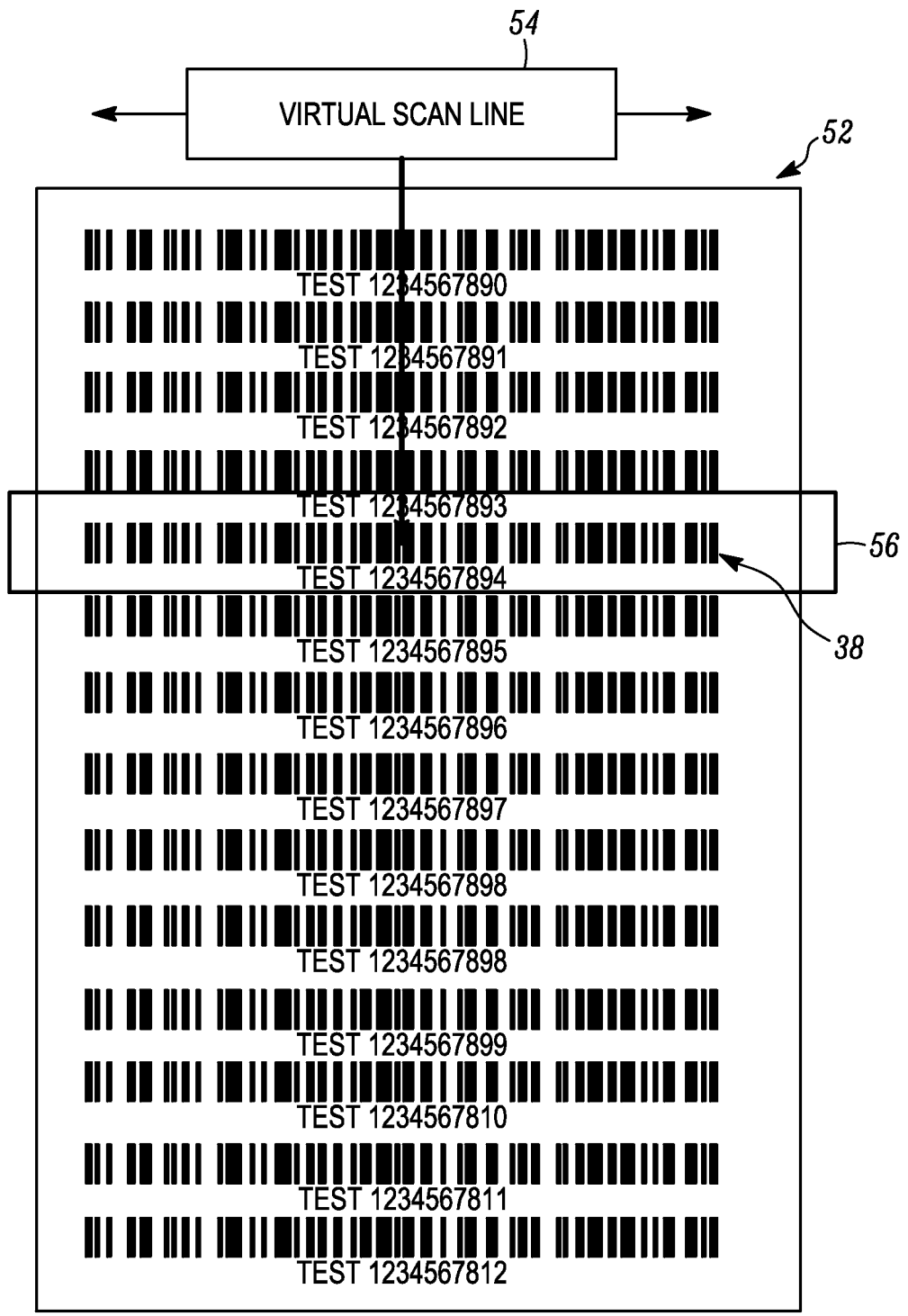
FIG. 3 is a view depicting how the reader of FIG. 1 can be guided to a selected target from a one-dimensional array of crowded targets.

As previously mentioned, there are circumstances in which multiple targets are tightly packed and closely arranged relative to one another so that it is difficult for the user to accurately aim the reader 30 at any one selected target 38 from among the multiple targets. For example, as shown in FIG. 3, multiple targets are closely stacked and crowded along a one-dimensional column, typically in a so-called pick list 52. In this example, the imager 24 is assumed to be one-dimensional such that a virtual scan line 54 is created. A user who wants to decode the selected target 38, which is the fifth target down from the top of the pick list 52 and located in box 56, with the linear virtual scan line 54, initially aims the reader 30 outside the column at the top of the pick list 52, and actuates the trigger 34 to the aiming state. Then, the user moves the reader 30 down the pick list 52. At the topmost target, a first aiming sound is generated and heard by the user when the controller 36 determines that the topmost target is located in the field of view, and preferably in the center of the field of view. At the next lower target in the pick list 52, another aiming sound is generated and heard by the user, again when the controller 36 determines that the next lower target is located in the field of view, and preferably in the center of the field of view. The user counts these aiming sounds and, after counting five aiming sounds, the user has now been audibly guided to the selected target 38, and then releases the held trigger 34 to transmit the decoded data from the selected fifth target 38 away from the reader 30. The audible successful reading sound is now generated.

Figure 4:
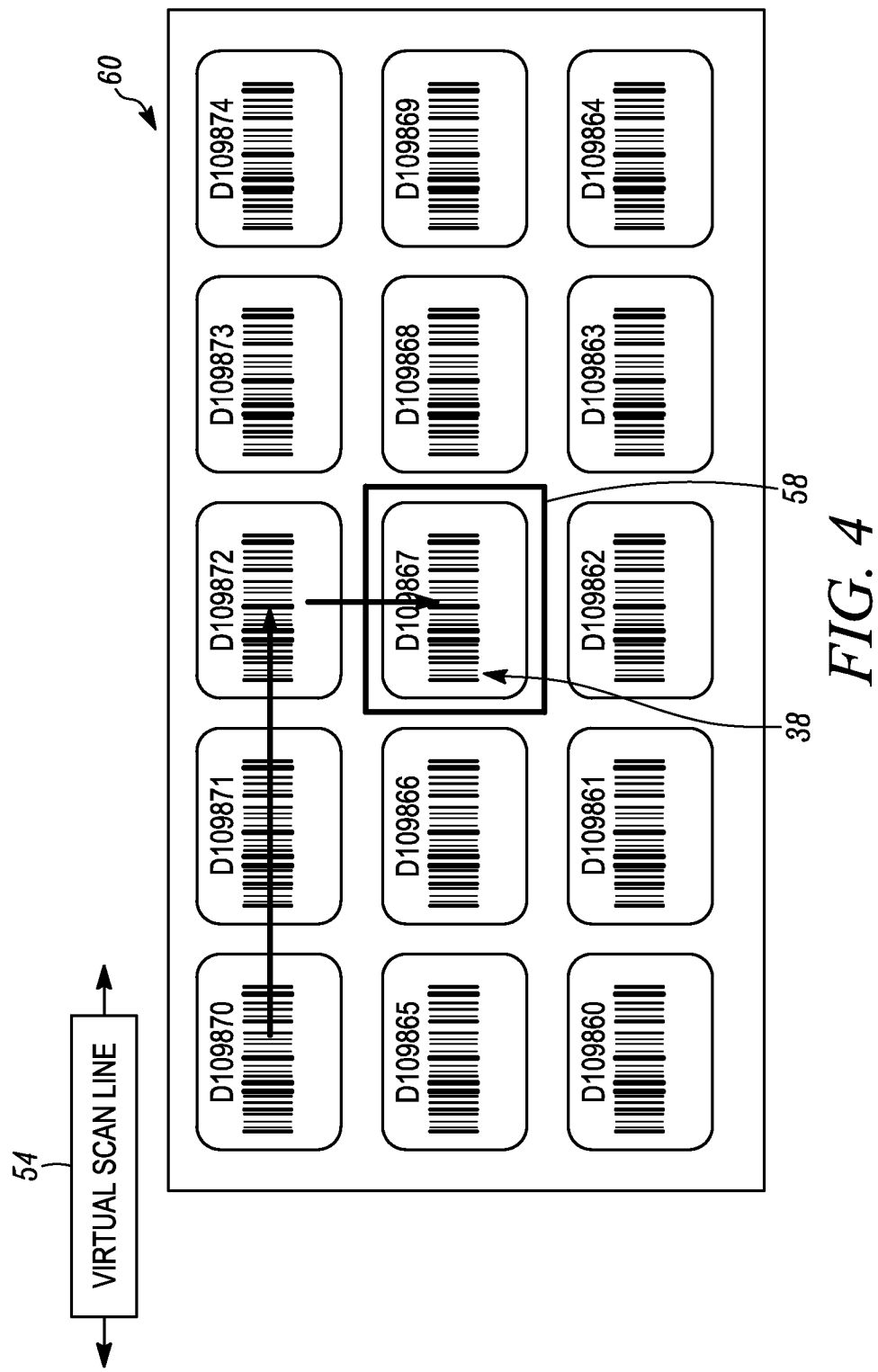
FIG. 4 is a view depicting how the reader of FIG. 1 can be guided to a selected target from a two-dimensional array of crowded targets.

As another example, as shown in FIG. 4, the multiple targets are closely spaced together in a two-dimensional array of mutually orthogonal rows and columns, typically on a so-called pick sheet 60, again making it difficult to aim the reader 50 at the selected target 38 from the array. A user, who wants to decode the selected target 38, which is the target located in the third column and in the second row of the array in the box 56, with the linear virtual scan line 54, initially aims the reader 30 outside an outer corner of the array (in this case, the top left), and actuates the trigger 34 to the aiming state. Then, the user moves the reader 30 over the array in the directions indicated by the arrows. At the top leftmost target, a first aiming sound is generated and heard by the user when the controller 36 determines that the top leftmost target is located in the field of view, and preferably in the center of the field of view. At the next two targets to the right, two more aiming sounds are generated and heard by the user, again when the controller 36 determines that each successive target is located in the field of view, and preferably in the center of the field of view. At the next target down, a fourth aiming sound is generated and heard by the user. The user counts these aiming sounds and, after counting these four aiming sounds, the user has now been audibly guided to the selected target 38, and then releases the held trigger 34 to transmit the decoded data from the selected target 38 away from the reader 30. The audible successful reading sound is now generated.

Preferably, the beeper 50 would only beep once per each time a successive individual target crosses the center of the field of view. Advantageously, the beeper 50 is reset after a short timeout so that a user, who saw a target at the edge of the array and then decided to move the field of view of the reader 30 off the array, could then start again on the same target if desired. Advantageously, the controller 36 is further operative, in the aiming state of the trigger 34, for detecting when each detected successive target exits the field of view, and for generating the audible aiming sound before each detected successive target exits the field of view. Thus, the beeper 50 generates a first aiming sound when the controller 36 determines that a first detected target has left the field of view, and then generates a second aiming sound when the controller 36 determines that a second detected target has left the field of view, and so forth, all while the trigger 354 is in the aiming state.

Then, after the beeper 50 generates an aiming sound for the selected target 38, the trigger 34 is actuated to the reading state, after which the successful reading sound is generated.

Figure 5:
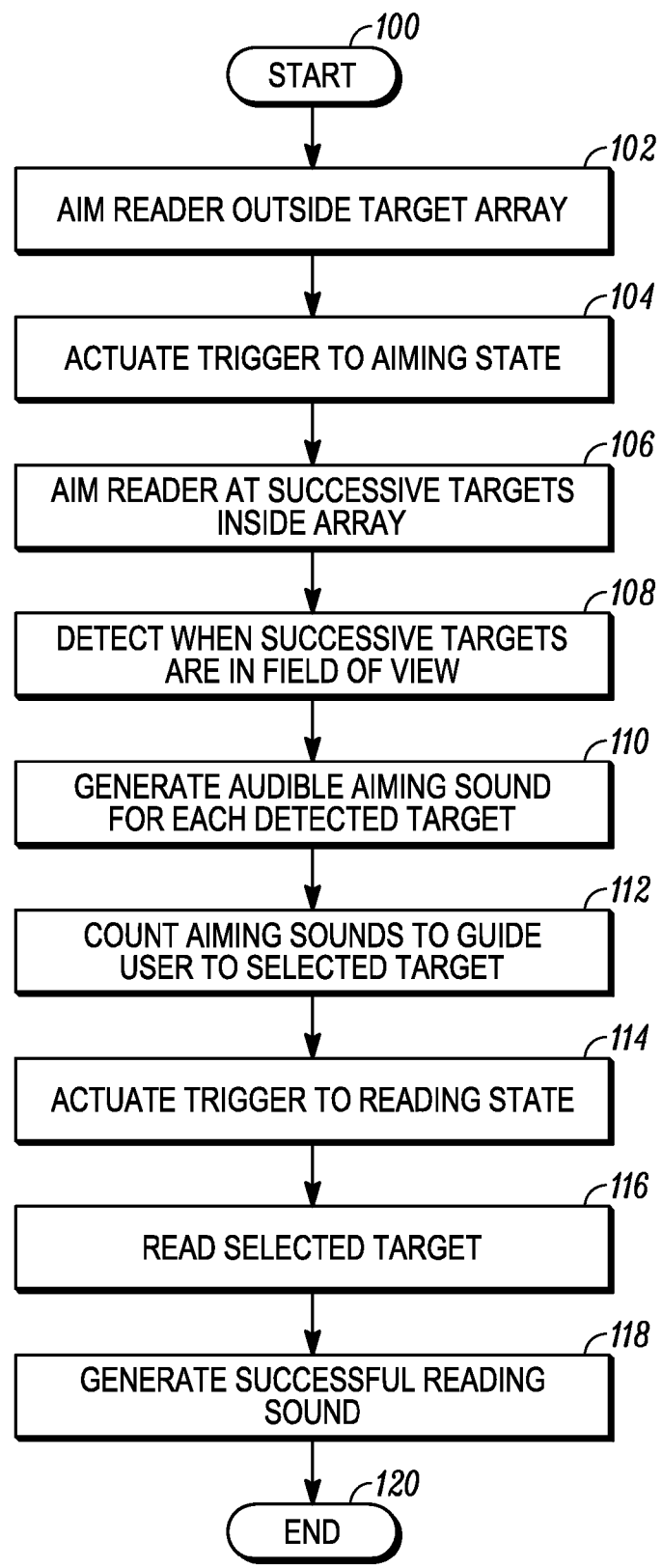
FIG. 5 is a flow chart depicting operation of a method in accordance with the present disclosure.

Turning to the operational flow chart of FIG. 5, a reading session begins at start step 100. The reader 30 is initially aimed outside the array 52, 60 in step 102. The trigger 34 is manually actuated to an aiming state in step 104. Thereupon, the reader 30 is successively aimed at successive targets inside the array 52, 60 in step 106. An image of each successive target at which the reader 30 is successively aimed is captured over a field of view of the imaging assembly, and each image is processed in succession to detect when each successive target is located in the field of view in step 108. An audible aiming sound is generated for each detected successive target in step 110. The user is audibly guided to aim the reader 30 at the selected target 38 by listening to the audible aiming sound for each detected successive target, and by counting the number of audible aiming sound in step 112. The trigger 34 is manually actuated to a reading state in step 114. The selected target 38 is read, and read data indicative of the selected target 38 is transmitted to a remote host in step 116. The audible successful reading sound is now generated in step 118. The reading session ends at end step 120.

In the foregoing specification, specific embodiments have been described. However, one of ordinary skill in the art appreciates that various modifications and changes can be made without departing from the scope of the invention as set forth in the claims below. For example, the actuation of the trigger 34 need not be a pull-and-hold action, followed by a release action. Instead, a single trigger can be pulled to a first extent to execute one of these actions, and then pulled to a second extent to execute the other of these actions. Alternatively, separate triggers may be utilized, with each trigger executing a different action. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains ... a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for audibly guiding a user to a selected barcode symbol from an array of barcode symbols, comprising:
   a handheld housing successively aimable by the user at successive barcode symbols in the array;
   a trigger supported by the housing and manually actuatable between an aiming state and a reading state;
   an imaging assembly supported by the housing, and operative for capturing over a field of view an image of each one of the successive barcode symbols at which the housing is successively aimed;
   an auditory annunciator supported by the housing; and
   a controller operative, in the aiming state of the trigger, for processing the image to detect when each successive barcode symbol in the array of barcode symbols moves across the center of the field of view as the field of view moving among the array of barcode symbols and for responsively controlling the annunciator to generate an audible aiming sound for each detected barcode symbol obtained from said processing the image before manually actuating the trigger to a reading state to decode the selected barcode symbol, and the controller being further operative, in the reading state of the trigger, for transmitting away from the housing data indicative of a processed image of the selected barcode symbol.

2. The apparatus of claim 1, wherein the housing has a handle by which the housing is held by the user, and wherein the trigger is supported by the handle.

3. The apparatus of claim 1, wherein the trigger is pulled and held by the user in the aiming state, and is released by the user in the reading state.

4. The apparatus of claim 1, wherein the imaging assembly includes a solid-state imager having a sensor array of image sensors, and an imaging lens for focusing the captured image onto the sensor array.

5. The apparatus of claim 1, wherein the imaging assembly is operative for capturing the image of each successive barcode symbol when the controller determines that each successive barcode symbol is generally centrally located in the field of view.

6. The apparatus of claim 1, wherein the audible successful reading sound and an audible aiming sound are both generated by the annunciator.

7. The apparatus of claim 1, wherein the controller is operative for re-setting the annunciator after each audible aiming sound has been generated.

8. The apparatus of claim 1, wherein the controller is operative, in the aiming state of the trigger, for detecting when each detected successive barcode symbol exits the field of view, and for generating the audible aiming sound before each detected successive barcode symbol exits the field of view.

9. The apparatus of claim 1, wherein the controller is operative, in the reading state of the trigger, for generating for the selected target an audible successful reading sound that is different from each audible aiming sound.

10. A method of audibly guiding a user to a selected barcode symbol from an array of barcode symbols, comprising:
   successively aiming a handheld housing at successive barcode symbols in the array;
   manually actuating a trigger on the housing to an aiming state;
   capturing over a field of view an image of each one of the successive barcode symbols at which the housing is successively aimed;
   processing the image to detect when each successive barcode symbol in the array of barcode symbols moves across the center of the field of view as the field of view moving among the array of barcode symbols in the aiming state of the trigger;

generating an audible aiming sound for each detected barcode symbol obtained from said processing the image in the aiming state of the trigger;

audibly guiding the user to aim the housing at the selected barcode symbol by listening to the audible aiming sound for each one of the successive barcode symbols that is detected from said processing the image;

manually actuating the trigger to a reading state; and transmitting away from the housing data indicative of a processed image of the selected barcode symbol in the reading state of the trigger.

11. The method of claim 10, wherein the actuating is performed by the user pulling and holding the trigger in the aiming state, and releasing the trigger in the reading state.

12. The method of claim 10, and generating both the audible successful reading sound and an audible aiming sound by a common annunciator.

13. The method of claim 10, and arranging the barcode symbols in a two-dimensional array.

14. The method of claim 10, and arranging the barcode symbols in a one-dimensional array.

15. The method of claim 10, and initially aiming the housing outside the array, and thereupon successively aiming the housing at successive barcode symbols inside the array.

16. The method of claim 10, and counting each audible aiming sound heard by the user until the selected barcode symbol is reached.

17. The method of claim 10, wherein the capturing is performed when each successive barcode symbol is generally centrally located in the field of view.

18. The method of claim 10, and re-setting a time period after each audible aiming sound has been generated.

19. The method of claim 10, and detecting, in the aiming state of the trigger, when each detected successive barcode symbol exits the field of view, and generating the audible aiming sound before each detected successive barcode symbol exits the field of view.

20. The method of claim 10, and generating, for the selected target in the reading state of the trigger, an audible successful reading sound that is different from the audible aiming sound.

* * * * *